United States Patent [19]

Evans et al.

[11] 4,363,127
[45] Dec. 7, 1982

[54] LINE SIGNALING APPARATUS AND TECHNIQUES FOR DIGITAL DATA LINKS

[75] Inventors: Randall G. Evans; James F. Buddenhagen, both of San Jose, Calif.

[73] Assignee: Ford Aerospace & Communications Corporation, Detroit, Mich.

[21] Appl. No.: 224,367

[22] Filed: Jan. 12, 1981

[51] Int. Cl.$^3$ .............................................. H03K 13/22
[52] U.S. Cl. ........................................ 375/30; 375/34; 370/110.4; 179/84 VF
[58] Field of Search ................... 375/25, 26, 27, 28, 375/94.30, 5, 34; 332/11 D; 179/1 SC, 1 SD, 1 D, 1 MN, 1 VC, 84 VF, 2 DP, 18 FA, 84 R, 18 HB; 370/110.4

[56] References Cited

U.S. PATENT DOCUMENTS

| | | | |
|---|---|---|---|
| 3,941,924 | 3/1976 | Leiboff | 375/28 |
| 3,999,129 | 12/1976 | Kasson | 375/26 |
| 4,071,692 | 1/1978 | Weir et al. | 375/25 |
| 4,122,300 | 10/1978 | Busigny | 375/28 |
| 4,132,864 | 1/1979 | Feng | 179/18 FA |
| 4,199,664 | 4/1980 | Grange et al. | 179/18 FA |

Primary Examiner—Benedict V. Safourek
Assistant Examiner—Stephen Chin
Attorney, Agent, or Firm—A. Huang; E. J. Radlo; R. D. Sanborn

[57] ABSTRACT

Statistical properties of a signal are used to distinguish between a voice signal and an "on hook" indication on a low bandwidth digital data link. Noise is intentionally added to the voice signal to guarantee a minimum power level, while not disrupting normal demodulation. A digital signal, having a known maximum power level upon demodulation, is used to represent the "on hook" condition. Upon demodulation, the minimum power level of the noise-colored voice signal is greater than the maximum power level of the "on-hook" signal, and the two signals can be distinguished by a power level threshold detector. This apparatus and technique is particularly well-suited to under-sampled, such as CVSD (continuously variable slope delta), data links, which are usually noisy and distorted. It alleviates the need for direct access to the digital link and simplifies the required hardware and retrofit modifications.

7 Claims, 2 Drawing Figures

LINE SIGNALING APPARATUS AND TECHNIQUES FOR DIGITAL DATA LINKS

BACKGROUND OF THE INVENTION

1. Field of the Invention

This invention relates to the signaling of unbusy and busy line information on a digital data link, with particular applicability to low bandwidth data links.

2. Description of the Prior Art

A prior art search was conducted and the following patent references were uncovered:

U.S. Pat. No. 4,132,864 detects if a telephone is on or off hook in the presence or absence of a ringing current by monitoring the percentage of time the voltage across the phone is positive. Our invention relates to a digital rather than an analog communications channel, and uses the strength of the background noise rather than the positive duty cycle to distinguish between the on and off hook conditions.

U.S. Pat. No. 4,199,664 detects if a telephone is on or off hook in the presence or absence of a ringing current by observing a phase shift introduced by the impedance difference of the phone in the on and off hook conditions. Our invention relates to a digital rather than an analog communications channel and uses the strength of the background noise rather than the phase shift to distinguish between the on and off hook conditions.

SUMMARY OF THE INVENTION

An analog voice signal is mixed (summed) with the output of a noise generator to insure a minimum amount of noise in the signal to be transmitted. This signal is then fed to an analog-to-digital modulator and transmitted by a digital data link to a digital-to-analog demodulator which produces a recognizable version of the voice signal. An "on hook" (unbusy) condition is signaled by generating a bit stream on the digital data link which, upon demodulation, produces a signal with a power level that is always below that of the noise-colored voice signal. The voice (i.e., busy) and "on hook" signals can then be distinguished with a power level threshold discriminator. There are many possible "on hook" bit patterns and many possible ways of producing these patterns. The only requirements are that upon demodulation the "on hook" bit stream have a guaranteed and detectable lower power level than that of the noise-colored voice signal, and that the injected noise is not so powerful as to disrupt proper demodulation of the voice signal.

BRIEF DESCRIPTION OF THE DRAWINGS

These and other more detailed and specific objects and features of the present invention are more fully discussed in the following specification, reference being had to the accompanying drawings, in which.

DESCRIPTION OF THE PREFERRED EMBODIMENTS

A typical telephone channel must convey voice signals, on or off hook status, and possibly dialing information. The traditional technique for transmitting the non-voice information relies on using E-leads and M-leads (E/M signaling). The usual practice is to carry this E/M information by tones, either in-band (e.g., 2600 Hz) or out-of-band (e.g., 3825 Hz). In such a system, the M-lead controls a gated tone oscillator which transmits a tone on idle (on-hook) condition. The receiver notes that presence or absence of the signaling tone and correspondingly controls the state of the E-lead.

When in-band signaling is used, the tone receiver incorporates a guard band circuit that compares the total energy at the signaling tone frequency (e.g., 2600 Hz) to the total energy within the voice band (300 Hz to 3400 Hz) but outside the signaling tone frequency, the assumption being that a pure tone will not have any energy outside the signaling tone frequency. If the tone energy is not greater than the total remaining voice band energy, then the tone detector is disabled.

These techniques were originally developed for analog telephone channels. It is desirable to have similar techniques for digital channels. One type of digital link of particular interest involves the use of continuously variable slope delta (CVSD) modulator/demodulator codecs, operating at very low sampling rates (e.g., 16 Kb/s), to encode and decode voice signals. This low sampling rate saves bandwidth but severely undersamples the signal, producing very large signal distortion and high noise levels. Fortunately, the human ear is very tolerant of these distortions in human speech so there is little degradation in speech intelligibility despite the degradation in speech quality. Unfortunately, this undersampling severely distorts a tone signal by aliasing the frequency and adding noise. This affects the detection of the tone by corrupting the quality of the tone and altering the non-tone voice band energy. As a result, the usual way of carrying E/M information on such a channel is to multiplex the signaling information into the digital data stream. This requires access to the data stream and digital hardware to insert and extract this information from the data stream. This is a complicated process and requires extensive retrofit modifications to already existing systems.

Figure 1:
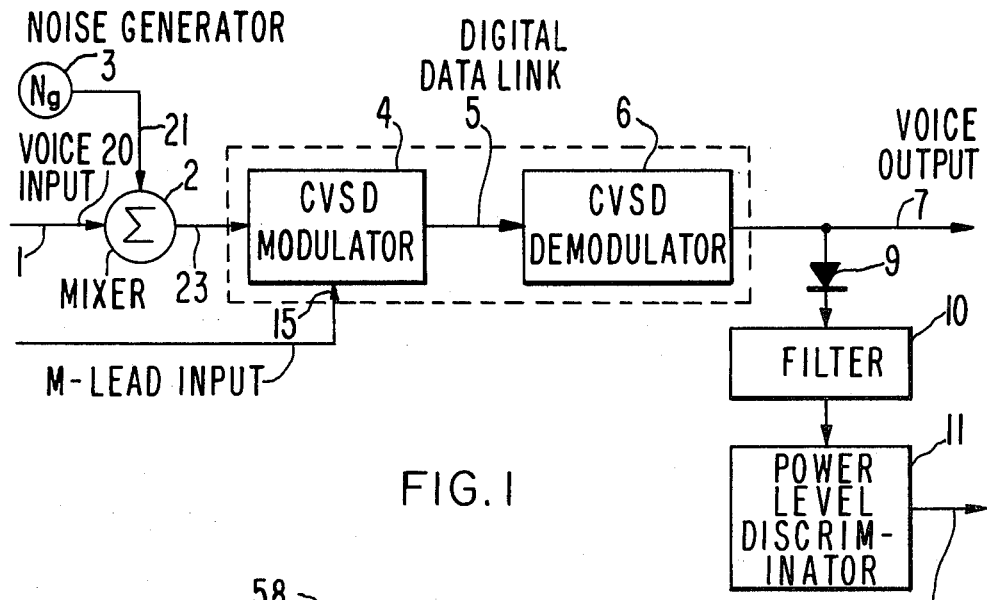
FIG. 1 shows a background noise E/M signaling system for use with a continuously variable slope delta modulator and demodulator.

Our E/M signaling scheme for use with low sampling rate (e.g., 16 Kb/s) CVSD modulation/demodulation codecs, which avoids these problems, is shown in FIG. 1. A voice signal is applied to input 20 of mixer (summer) 2. The output of noise generator 3 is applied to input 21 of mixer 2. The output 23 of mixer 2 is connected to the input of CVSD modulator 4, such as a Motorola MC 3418 or MC 3417. The output of modulator 4 is connected to a digital data link 5. The output of digital data link 5 is then used as the input of CVSD demodulator 6, such as a Motorola MC 3418 or MC 3417. The transmitted voice signal emerges from the demodulator at 7. An M-lead input is connected to the forced-idle-pattern input 15 of modulator 4 (pin 15 in the case of a MC 3418, with pins 9 and 13 connected together). Diode 9, used as a detector, has either end connected to the output 7 of demodulator 6 and its other end connected to the input of an integrating filter 10. The output of filter 10 is fed to the input of threshold power level discriminator 11. The output of discriminator 11 is used as the E-lead output.

A voice signal is transmitted by feeding the analog voice input signal to input 20 of mixer 2 and not activating the M-lead input. The voice signal is summed by mixer 2 with a signal from noise generator 3 to produce a signal with a preselected amount of added noise. The output of mixer 2 is fed to the input of continuously variable slope delta modulator 4. A digital version of the signal is outputted by modulator 4 and transmitted by the digital data link 5. This digital version of the signal is then demodulated by continuously variable slope delta demodulator 6 and outputted at 7.

An "on hook" condition is transmitted by applying a signal to the M-lead input at 15. This signal activates the forced-idle-pattern input of CVSD modulator 4. This results in an alternating stream of 1's and 0's being sent along digital data link 5. This stream of data is then demodulated by CVSD demodulator 6. This particular stream of alternating 1's and 0's produces a very quiet signal with a typical power level of at most $-60$ dBmO. This signal is distinctive since, if noise generator 3 imparts $-40$ dBmO of noise, the power level of the demodulated noise-corrupted voice signal will be at least $-40$ dBmO. Having noise generator 3 add at least $-40$ dBmO of noise also guarantees that CVSD modulator 4 will never accidentally generate the forced-idle stream of alternating 1's and 0's. The only other requirement for proper functioning of the system is that the noise added by generator 3 not be so great as to degrade channel performance. Since the normal CVSD noise level is $-30$ dBmO, the $-40$ dBmO injected noise is significantly lower, and this requirement is therefore met for the example illustrated.

The task of distinguishing between an "off hook" signal and an "on hook" signal then becomes one of distinguishing between a signal having a power level of at least $-40$ dBmO and a signal having a power level of at most $-60$ dBmO. These two signals can be distinguished by power level discriminator 11, e.g., a conventional "noise" threshold detector, where the threshold is preset to a value greater than $-60$ dBmO but less than $-40$ dBmO. The signal is detected by diode 9, and the resulting signal is filtered by integrating filter 10 (to suppress spurious detections). Filter 10 smooths the signal over a predetermined time governed by its time constant, where the time has been selected to be adequate to insure that the power of the demodulated noise-corrupted voice signal will be always detectably higher than the power of the demodulated forced idle pattern signal. Then power level discriminator 11 is used to distinguish between the expected power levels of the noise-colored voice and the "on-hook" signal. The output of detector 11 is used as the E-lead output.

Figure 2:
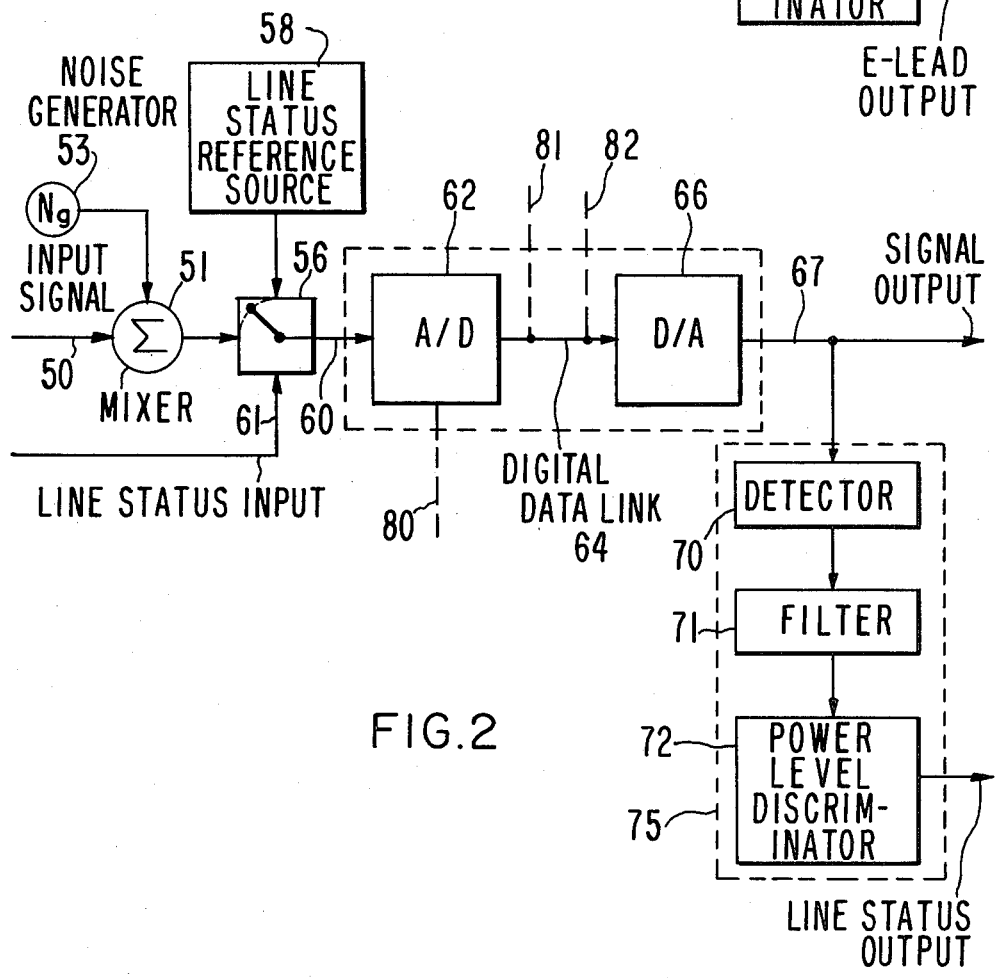
FIG. 2 shows a generalized line signaling system for use with any digital data link.

This technique for E/M signaling over the digital link is extended to a more generalized signaling system in FIG. 2. An analog input signal is fed to input 50 of mixer (summer) 51. The output of noise generator 53 is fed to a second input of mixer 51. The output of mixer 51 is fed to a first input of switch 56. An "on-hook" or other line status reference signal source 58, which can convey any desired line signaling information, is connected to a second input of switch 56. A conventional line status input line, analogous to M-lead input 15 in the FIG. 1 example, is connected to a third input 61 of switch 56. Switch 56 is a single-pole double-throw switch which allows selectable switching between source 58 and mixer 51, in response to switching signals conveyed by line status input 61. The output of switch 56 is connected to the input of analog-to-digital converter (modulator) 62, e.g., a PCM modulator, which is the analogue of modulator 4 in FIG. 1. The output of modulator 62 is connected to the input of digital data link 64. The input of digital-to-analog converter (demodulator) 66, analogous to demodulator 6 of FIG. 1, is connected to the output of digital data link 64. The output 67 of demodulator 66 produces a signal output which is a replica of the signal input at 50. This output at 67 is also fed to power level threshold discriminator 75 consisting of signal detector 70, filter 71, and power level discriminator 72. The output of power level discriminator 72 is used as the line status output.

Our technique involves generating a recognizable "on hook" (unbusy) bit stream on the digital data link. Several types of "on hook" bit streams can be used and these bit streams can be generated in several ways. One approach involves the use of a special feature in the modulator as in the case of Motorola MC3418 or MC3417. This can be accomplished by connecting line status input 80 directly to modulator 62 (shown as a dotted line to indicate an alternative embodiment; this embodiment is also depicted in FIG. 1). Another method is to apply a constant voltage or other preselected reference signal to the input of modulator 62 to force it to generate a bit stream with the requisite characteristics sought by the particular demodulator 66. This is accomplished by using line status input 61 to force switch 56 to connect line status reference signal source 58 to the input of modulator 62 upon an "unbusy" condition.

Alternatively, an unbusy condition can be signaled by directly inserting the particular "unbusy" bit stream onto the digital link, by removing reference signal source 58 and switch 56, connecting the output of mixer 51 directly to the input of modulator 62, and inserting the on-hook pattern onto the digital data link by means of access 81. In this case, line status input 61 is used to switch 81 onto digital data link 64 upon the occurrence of an unbusy condition (not illustrated in FIG. 2)..

It can be seen that the technique illustrated by solid lines in FIG. 2 can be used to retrofit an existing system having arbitrary "unbusy" coding with a minimum of effort.

The conventional technique for recognizing the "unbusy" bit stream was to tap digital data link 64 by line 82 at a point just before demodulator 66 and to connect additional hardware to 82 to monitor for the unbusy pattern. This required accessing the digital link and additional hardware.

In our technique, the digital signal is demodulated by 66 into an analog signal at 67. The analog equivalent of an "on-hook" bit stream is then recognized by detector 70, integrating filter 71, and power level discriminator 72, based on the difference in power levels between the "on-hook" and voice (off-hook) signal. This difference is guaranteed by coloring the voice or other input signal by the output of noise generator 53. This signaling technique alleviates the need for access to the digital link and simplifies "on hook" detection hardware and retrofit modifications.

This invention can be further generalized as the manipulation of one of a set of statistical characteristics among several input signals in a manner such that they can be distinguished statistically after being corrupted by a noisy channel. Some of the characteristics which can be manipulated are average noise, average power, average frequency, and standard deviations with respect to each of said averages. These characteristics can be manipulated by shifting the level of or skewing the distribution of the particular property of the signal.

The above description is included to illustrate the operation of the preferred embodiments and does not limit the scope of the invention. The scope of the invention is to be limited only by the following claims. From the above discussion many variations will be apparent to one skilled in the art that would yet be encompassed by the spirit and scope of the invention.

What is claimed is:

1. Apparatus for distinguishing between an analog input signal and a line status signal wherein each of said signals is transmitted over a digital data link, comprising:
    a noise generator connected to said input signal;
    an analog-to-digital converter having a first input connected to said noise-corrupted input signal and a second input connected to said line status signal, and having an output connected to an input of said digital data link;
    a digital-to-analog converter having an input connected to an output of the digital data link and having an output connected to power distinguishing means;
    wherein the amount of noise generated by said noise generator is preselected to enable said power distinguishing means to distinguish between said noise-corrupted input signal and said line status signal.

2. Apparatus of claim 1 wherein:
    said analog-to-digital converter is a continuously variable slope delta modulator; and
    said digital-to-analog converter is a continuously variable slope delta demodulator;
    wherein the second input of said modulator is a forced-idle input.

3. Apparatus of claim 1 wherein said power distinguishing means comprises:
    a detector having an input connected to the output of said digital-to-analog converter;
    an integrating filter having an input connected to an output of the detector; and
    a power level discriminator having an input connected to an output of the filter.

4. Apparatus of claim 1 further comprising a line status reference signal source switchably connected to the second input of the analog-to-digital converter in response to said line status signal.

5. Apparatus of claim 1 wherein the noise generator is connected to the input signal via a summer; and
    as measured at the output of the digital-to-analog converter, the noise introduced by the generator has less power than the noise introduced by the modulation/demodulation process and greater power than the signal produced by the digital-to-analog converter in response to the line status signal.

6. A method of distinguishing between an analog input signal and a line status signal transmitted over a digital data link comprising:
    adding noise to the input signal;
    digitizing the noise-colored input signal;
    generated a line status bit stream pattern on the digital data link;
    transmitting a signal from the group consisting essentially of the digitized noise-colored input signal and the line status bit stream pattern;
    converting the transmitted signal from a digital to an analog representation;
    measuring the power of the analog representation; and
    comparing said measured power with a predetermined threshold level that is greater than B and less than A, where the level of added noise has been preselected so that its power is A following said transmitting and converting steps, and the power of said line status bit stream pattern is B following said transmitting and converting steps.

7. The method of claim 6 wherein the input signal is a voice signal;
    the digitizing is performed by a continuously variable slope delta modulator;
    the line status bit stream pattern is a forced idle pattern of the modulator; and
    the converting is performed by a continuously variable slope delta demodulator.

* * * * *